US012737697B2

(12) United States Patent
Agarwal et al.

(10) Patent No.: US 12,737,697 B2
(45) Date of Patent: Sep. 15, 2026

(54) NEXT BEST AGENT SELECTION IN AN ADAPTIVE WORKFLOW

(71) Applicant: International Business Machines Corporation, Armonk, NY (US)

(72) Inventors: Prerna Agarwal, New Delhi (IN); Renuka Sindhgatta Rajan, Bengaluru (IN); Jayachandu Bandlamudi, Guntur (IN); Sampath Dechu, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 18/633,899

(22) Filed: Apr. 12, 2024

(65) Prior Publication Data

US 2025/0322328 A1 Oct. 16, 2025

(51) Int. Cl.
*G06Q 10/0631* (2023.01)
*G06F 40/30* (2020.01)

(52) U.S. Cl.
CPC ..... *G06Q 10/063112* (2013.01); *G06F 40/30* (2020.01)

(58) Field of Classification Search
CPC ........................ G06Q 10/063112; G06F 40/30
See application file for complete search history.

(56) References Cited

U.S. PATENT DOCUMENTS

2004/0044516 A1* 3/2004 Kennewick ......... G10L 15/1822 704/E15.04
2004/0143932 A1* 7/2004 Chen ..................... E04B 2/7431 16/83
2020/0395007 A1* 12/2020 Cheng ...................... G06N 5/04
2022/0139385 A1* 5/2022 Cheng .................. G06F 40/205 704/9
2022/0300881 A1* 9/2022 Singh ..................... G06N 20/10
2023/0267323 A1* 8/2023 Agarwal ............ G06Q 10/0637 706/18
2024/0143932 A1* 5/2024 Pandita .................. G06F 40/44
(Continued)

FOREIGN PATENT DOCUMENTS

WO 2023165723 A1 9/2023

OTHER PUBLICATIONS

Patel, Dhaval, AssetOpsBench: Benchmarking AI Agents for Task Automation in Industrial Asset Operations and Maintenance, Jun. 4, 2025, arXiv.org, pp. 1-39 (Year: 2025).*
(Continued)

*Primary Examiner* — Dylan C White
(74) *Attorney, Agent, or Firm* — Samuel A. Waldbaum

(57) ABSTRACT

An embodiment extracts, from an utterance, a goal. An embodiment prompts a large language model (LLM) to select, using metadata describing a plurality of agents, a set of candidate agents from the plurality of agents, each candidate agent in the set of candidate agents corresponding to the goal. An embodiment scores, using metadata of the set of candidate agents, each candidate agent in the set of candidate agents, the scoring resulting in a set of scored candidate agents. An embodiment prompts the LLM to select, using a set of business policy constraints, a next agent from the set of scored candidate agents. An embodiment invokes the next agent, the invoking causing the next agent to perform an action furthering the goal.

20 Claims, 6 Drawing Sheets

(56) References Cited

U.S. PATENT DOCUMENTS

| | | | | |
|---|---|---|---|---|
| 2024/0362213 | A1* | 10/2024 | Grenader | G06F 16/24573 |
| 2024/0362476 | A1* | 10/2024 | Grenader | G06F 16/24522 |
| 2025/0086537 | A1* | 3/2025 | Naanaa | G06F 16/335 |
| 2025/0094390 | A1* | 3/2025 | Hettige | G06F 16/3329 |
| 2025/0094466 | A1* | 3/2025 | Grover | G06F 16/3344 |
| 2025/0094725 | A1* | 3/2025 | Vishnoi | G06F 16/90332 |
| 2025/0094734 | A1* | 3/2025 | Sridharan | G06F 9/453 |
| 2025/0190449 | A1* | 6/2025 | Zhang | G06F 16/288 |
| 2025/0193135 | A1* | 6/2025 | Sonnenblick | G06N 3/042 |
| 2025/0240351 | A1* | 7/2025 | Ostrand | G06F 40/35 |

OTHER PUBLICATIONS

Maragheh, Reza Y. The Future is Agentic: Definitions, Perspectives, and Open Challenges of Multi-Agent Recommendation Systems, Jul. 10, 2025, ACM Trans. Recomm. Syst. vol. 1, No. 1 (arXiv.org), pp. 1-35 (Year: 2025).*

Agarwal et al., Goal-Oriented Next Best Activity Recommendation using Reinforcement Learning, May 6, 2022.

Weinzierl et al., From predictive to prescriptive process monitoring: Recommending the next best actions instead of calculating the next most likely events, Mar. 8-11, 2020.

Gharahighehi et al., Addressing the Cold-Start Problem in Collaborative Filtering Through Positive-Unlabeled Learning and Multi-Target Prediction, Nov. 10, 2022.

Rizk et al., A Conversational Digital Assistant for Intelligent Process Automation, Jul. 27, 2020.

Kalia et al., Cataloger: Catalog Recommendation Service for IT Change Requests, Oct. 18, 2017.

Weinzierl et al., Prescriptive Business Process Monitoring for Recommending Next Best Actions, Aug. 19, 2020.

Khan et al., Decision Support for Knowledge Intensive Processes Using RL Based Recommendations, Aug. 14, 2021.

Branchi et al., Learning to act: a Reinforcement Learning approach to recommend the best next activities, Jun. 15, 2022.

Van Meteren et al., Using Content-Based Filtering for Recommendation, 2000.

Agarwal et al., Multi-Stage Prompting for Next Best Agent Recommendations in Adaptive Workflows, Mar. 24, 2024.

Bobadilla et al., A collaborative filtering approach to mitigate the new user cold start problem, Knowledge-Based Systems, vol. 26, pp. 225-238, Feb. 2012.

Rashid et al., Learning preferences of new users in recommender systems: an information theoretic approach, Dec. 20, 2008.

Lika et al., Facing the cold start problem in recommender systems, Expert Systems with Applications, vol. 41, Issue 4, Part 2, pp. 2065-2073, Mar. 2014.

* cited by examiner

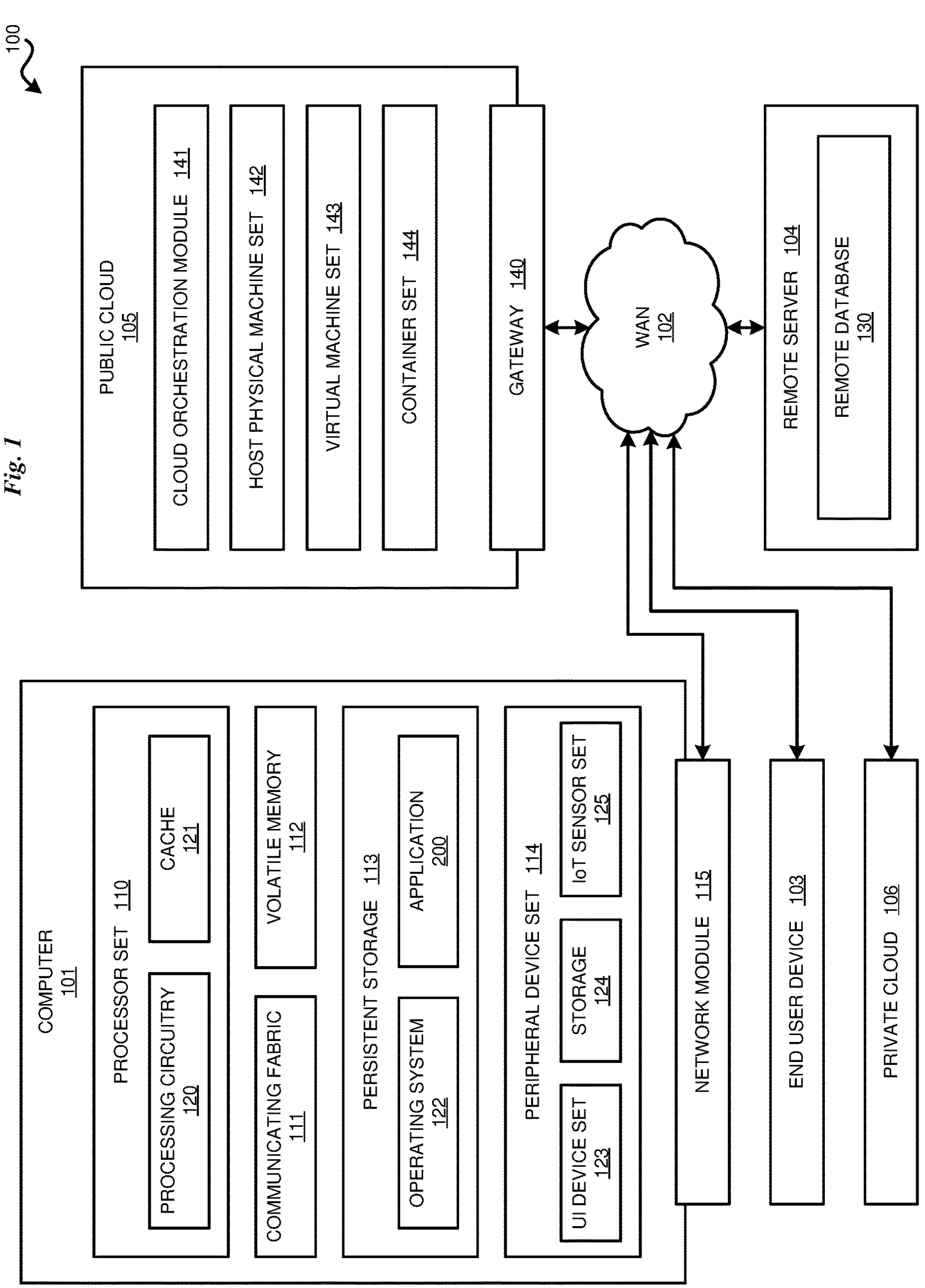
Fig. 1
100
COMPUTER 101
PROCESSOR SET 110
PROCESSING CIRCUITRY 120
CACHE 121
COMMUNICATING FABRIC 111
VOLATILE MEMORY 112
PERSISTENT STORAGE 113
OPERATING SYSTEM 122
APPLICATION 200
PERIPHERAL DEVICE SET 114
UI DEVICE SET 123
STORAGE 124
IoT SENSOR SET 125
NETWORK MODULE 115
END USER DEVICE 103
PRIVATE CLOUD 106
PUBLIC CLOUD 105
CLOUD ORCHESTRATION MODULE 141
HOST PHYSICAL MACHINE SET 142
VIRTUAL MACHINE SET 143
CONTAINER SET 144
GATEWAY 140
WAN 102
REMOTE SERVER 104
REMOTE DATABASE 130

*Fig. 3*

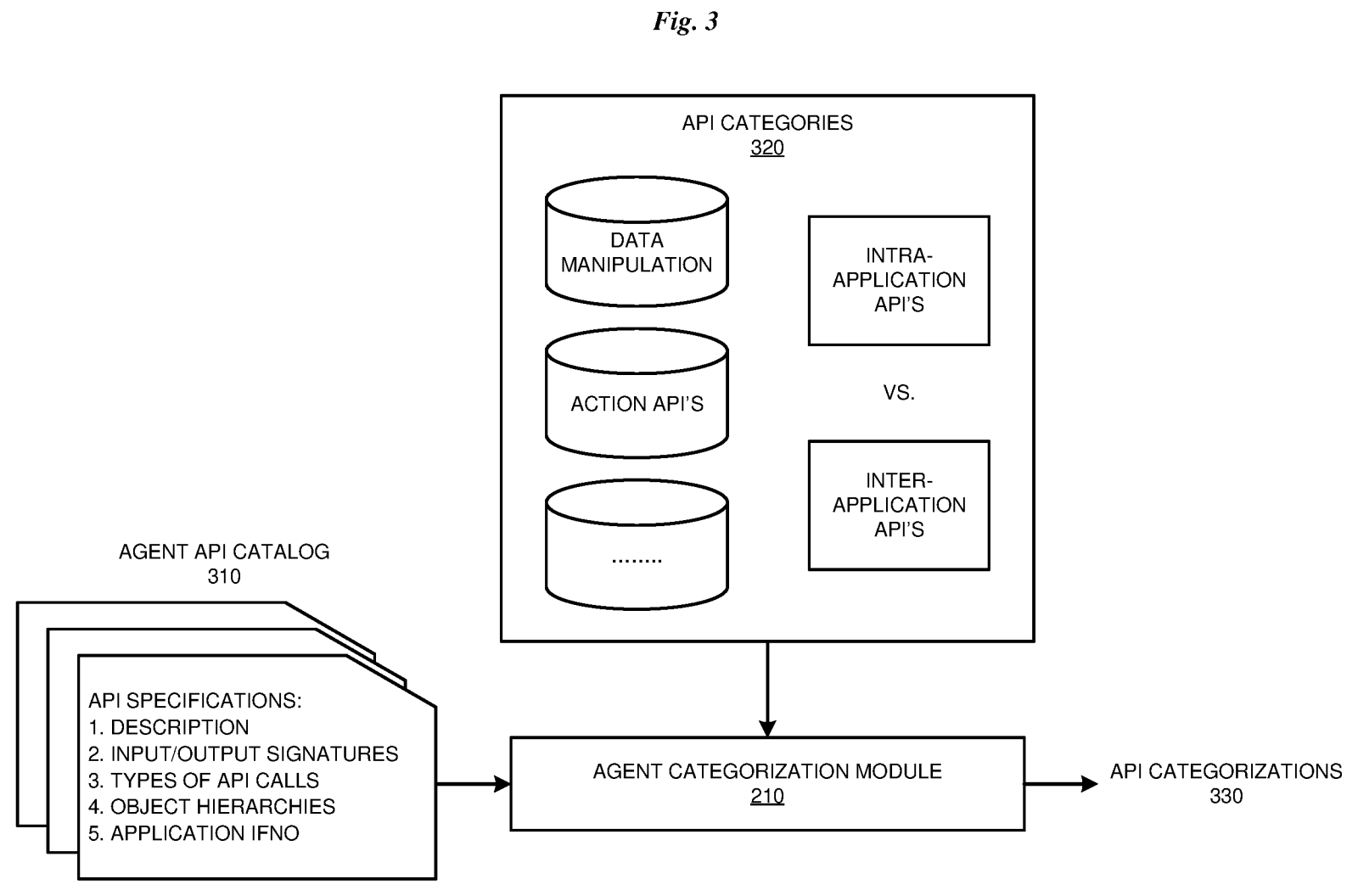

API CATEGORIES
320

DATA MANIPULATION

ACTION API'S

........

INTRA-APPLICATION API'S

VS.

INTER-APPLICATION API'S

AGENT CATEGORIZATION MODULE
210

API CATEGORIZATIONS
330

AGENT API CATALOG
310

API SPECIFICATIONS:
1. DESCRIPTION
2. INPUT/OUTPUT SIGNATURES
3. TYPES OF API CALLS
4. OBJECT HIERARCHIES
5. APPLICATION IFNO

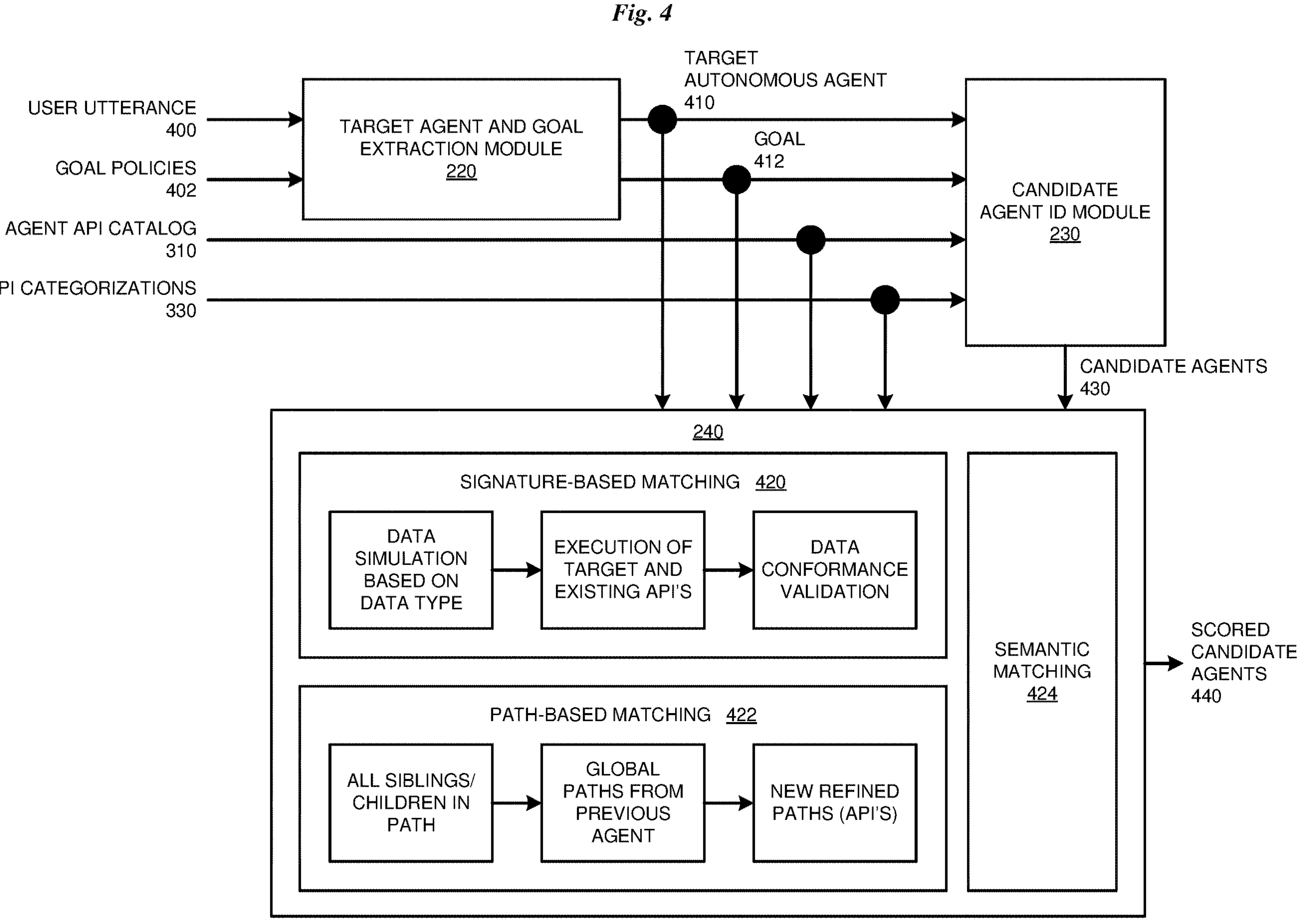
Fig. 4
USER UTTERANCE 400
GOAL POLICIES 402
AGENT API CATALOG 310
API CATEGORIZATIONS 330
TARGET AGENT AND GOAL EXTRACTION MODULE 220
TARGET AUTONOMOUS AGENT 410
GOAL 412
CANDIDATE AGENT ID MODULE 230
CANDIDATE AGENTS 430
240
SIGNATURE-BASED MATCHING 420
DATA SIMULATION BASED ON DATA TYPE
EXECUTION OF TARGET AND EXISTING API'S
DATA CONFORMANCE VALIDATION
PATH-BASED MATCHING 422
ALL SIBLINGS/ CHILDREN IN PATH
GLOBAL PATHS FROM PREVIOUS AGENT
NEW REFINED PATHS (API'S)
SEMANTIC MATCHING 424
SCORED CANDIDATE AGENTS 440

NEXT BEST AGENT SELECTION IN AN ADAPTIVE WORKFLOW

BACKGROUND

The present invention relates generally to software agent management. More particularly, the present invention relates to a method, system, and computer program for next best agent selection in an adaptive workflow.

A workflow is an orchestrated and repeatable pattern or sequence of activity. Traditional business applications rely on prescribed steps (i.e., workflows) that are prescriptive, codified, and automated using enterprise resource planning applications or workflow engines. However, prescribed steps are insufficiently adaptable to changing circumstances and needs. Thus, an adaptive workflow does not have a detailed prescription of how each step in a workflow is to be executed, but only prescribes a goal of the workflow. Adaptive workflows allow business users a certain degree of freedom to stitch together a sequence of process tasks to achieve their goals. Process tasks are invocable via the use of Application Programming Interfaces (APIs).

Business users often interact with an adaptive workflow using a conversational user interface (also referred to as a conversational interface, a chat interface, and a chatbot), a user interface for computers that emulates a conversation with a real human by allowing a user to communicate with a computer in natural language rather than in syntax specific commands. For example, a user might ask a question such as "what is today's weather" or "when does my subscription expire" and receive an answer phrased in conversational terms in the user's language. Conversational interfaces use a collection of presently available techniques known as natural language processing (NLP) to allow computers to understand, analyze, and create meaning from human language. Conversational interfaces are implemented in text form, voice form (typically converting input speech to text for processing, and converting text to output speech), or a combination. An utterance is a continuous piece of speech, by one person, before or after which there is silence on the part of the person. For example, "what is today's weather" or "when does my subscription expire" are both utterances.

Chat interfaces for executing process tasks in a workflow require calling an ordered sequence of agents via an API. A process task is a high-level task or activity of a business process. An agent refers to an atomic function corresponding to an operation of an API. Usually, multiple agents are sequenced together to accomplish a process task. When an agent is invoked in a conversational interface, the agent receives the required input parameters, performs the operation, and returns the output. An agent definition includes metadata such as agent description, a description of the inputs and outputs of the API, the types of API calls the API supports, (e.g., GET, POST), any object hierarchies the API is a part of, application information of the API (e.g., whether the API is a part of a particular application), and additional details required to execute the agent. Agents are available from multiple sources, such as functionality deployed in a cloud-based manner, publicly available repositories, or an organization-specific repository. An API repository is also referred to as an API catalog.

Often, a user needs guidance through a set of possible steps in a process or adaptive workflow. Execution of each agent produces the data that is used by the next agent to continue executing a sequence towards achieving a goal.

Next best agent recommendation helps a user that executed a first agent to select and invoke a next agent to achieve a certain goal.

An agent might be used in more than one process task. For example, a process task of updating an order might require use of a get_order agent and a save_order agent, while a process task of approving an order might require a get_order agent, an approve_order agent, and a notify agent. Hence, the next best agent recommendation and selection varies in the context of the process task. Business policies that define certain checks and constraints that must happen at certain points in a workflow must also be considered. As well, in an adaptive workflow, the goal itself can change.

SUMMARY

The illustrative embodiments provide for next best agent selection in an adaptive workflow. An embodiment includes extracting, from an utterance, a goal. The embodiment includes prompting a large language model (LLM) to select, using metadata describing a plurality of agents, a set of candidate agents from the plurality of agents, each candidate agent in the set of candidate agents corresponding to the goal. The embodiment includes scoring, using metadata of the set of candidate agents, each candidate agent in the set of candidate agents, the scoring resulting in a set of scored candidate agents. The embodiment includes prompting the LLM to select, using a set of business policy constraints, a next agent from the set of scored candidate agents. The embodiment includes invoking the next agent, the invoking causing the next agent to perform an action furthering the goal. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 1 depicts a block diagram of a computing environment in accordance with an illustrative embodiment;

FIG. 3 depicts an example of next best agent selection in an adaptive workflow in accordance with an illustrative embodiment;

FIG. 4 depicts a continued example of next best agent selection in an adaptive workflow in accordance with an illustrative embodiment;

DETAILED DESCRIPTION

Figure 2:
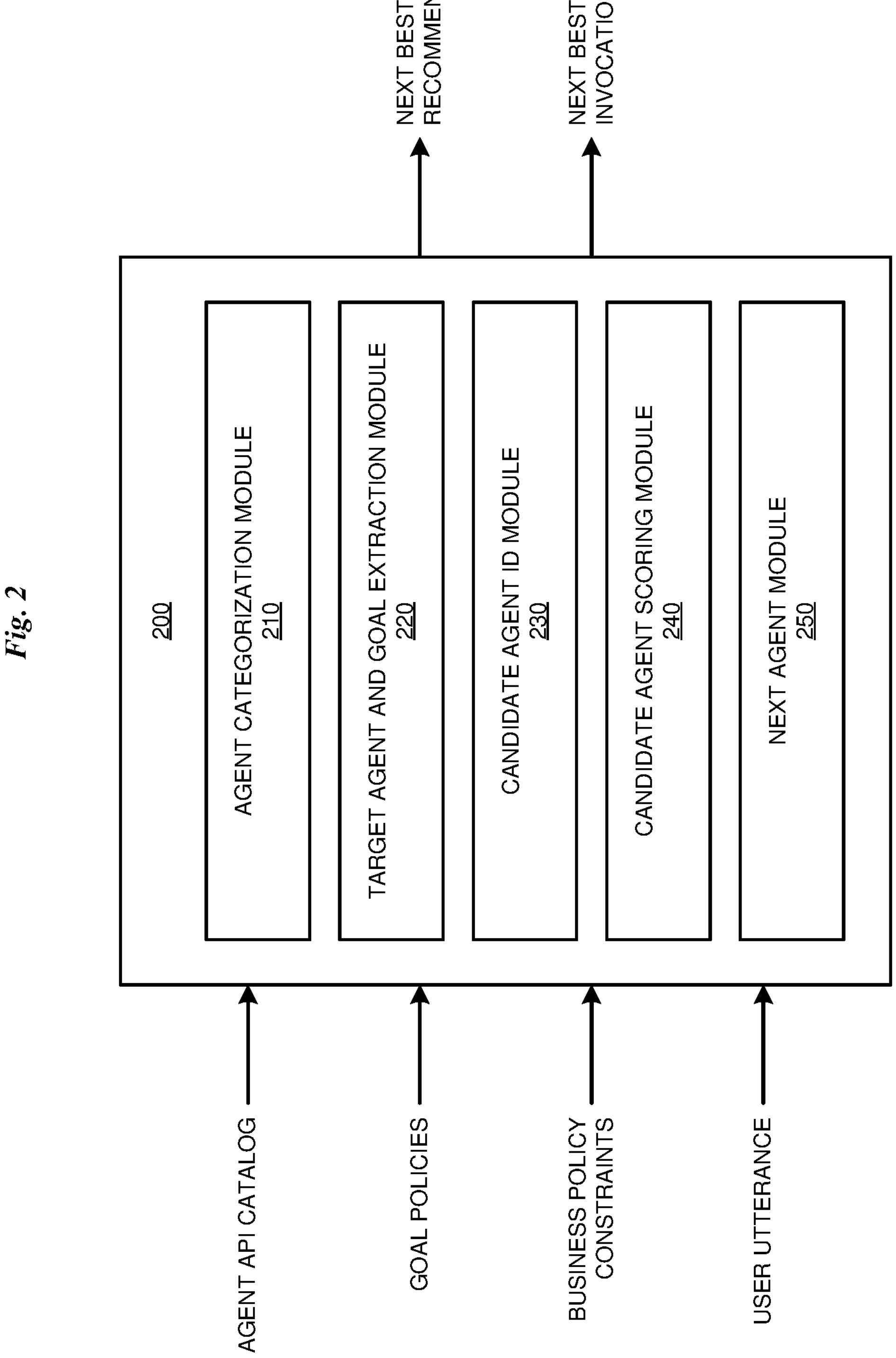
FIG. 2 depicts a block diagram of an example configuration for next best agent selection in an adaptive workflow in accordance with an illustrative embodiment.

The illustrative embodiments recognize that existing next best agent recommendation implementations focus on traditional business processes having predefined sequences of process tasks and rely on historical data of these predefined sequences. However, adaptive workflows are often a combination of structured and unstructured information, making it harder to extract historical data from such workflows. As well, because adaptive workflows change, and new and updated agents continually become available, historical data is often out of data, thus making it difficult to implement next best agent recommendation with a desired level of quality. In addition, historical data is not always available. When historical data is not available, existing next best agent recommendation implementations use deterministic rules, which are designed by human process stakeholders before a workflow management system is deployed, and do not scale or adapt to a changing workflow. Existing next best agent recommendation implementations are not guaranteed to conform to a particular API's data requirements, and often provide only a single highest probable agent. Thus, the illustrative embodiments recognize that there is an unmet need for next best agent recommendation that does not rely on historical data and adapt to an adaptive workflow, changing goal, and new or modified agents.

The present disclosure addresses the deficiencies described above by providing a process (as well as a system, method, machine-readable medium, etc.) that extracts a goal from an utterance, prompts a large language model (LLM) to select, using metadata describing a plurality of agents, a set of candidate agents from the plurality of agents, each agent in the set of candidate agents corresponding to the goal, scores each candidate agent using metadata of the set of candidate agents, prompts the LLM to select, using a set of business policy constraints, a next agent from the set of scored candidate agents, and invokes the next agent, causing the next agent to perform an action furthering the goal. Thus, the illustrative embodiments provide for next best agent selection in an adaptive workflow.

An illustrative embodiment receives goal policies, a set of goals supported by an embodiment. Some non-limiting examples of goal policies are: provide support for a product defect, account access, shipping issues, and the like. An illustrative embodiment receives a user utterance. Two non-limiting examples of an utterance are: "when does my subscription expire" and "how much is shipping on Product A". Using a presently available intent identification model and one or more goal policies, an embodiment extracts a goal from the utterance. The goal is a task the user wants to perform. One embodiment also identifies a target agent that could be used to accomplish at least a portion of the goal. For example, for the utterance "when does my subscription expire", a goal might be subscription_inquiry and a target agent might be the subscription_status agent. One embodiment also extracts metadata of the goal from the utterance and one or more goal policies.

An illustrative embodiment has access to metadata describing a plurality of agents. The agents are available for use by an embodiment to further or accomplish the goal. In one embodiment, the agents are stored in an agent catalog or repository. An embodiment uses the metadata to classify an agent into one or more categories. One embodiment uses a presently available technique to classify agents into a data manipulation or an action category, based on an API's description and the operators supported (e.g., GET, POST, PUT, DELETE and CRUD Operators (create, read, write, delete)). Another embodiment classifies agents as either intra-application (belonging to the same application as a target agent) or inter-application (belonging to a different application from the target agent. This can be identified from the metadata information, for example using an application-id tag in agent metadata.

An embodiment uses metadata describing the plurality of agents, for example the API descriptions, as well as the goal and metadata of the goal, to generate a prompt to a trained LLM. An LLM, implemented using an artificial neural network, is a presently available language model that, when trained, can perform general-purpose language generation and other natural language processing tasks such as classification. An input to an LLM is referred to as a prompt, because the input prompts the LLM to produce a corresponding output. One embodiment generates a prompt that includes the goal and descriptions of the agents (from metadata describing the plurality of agents). The prompt asks the LLM for the top-k (where k denotes an integer) next best agents that should be sequenced after a target agent, with which to implement an action furthering the goal. These top-k next best agents are candidate agents, and correspond to the goal. One embodiment also includes guidance language in the prompt to limit the output to a particular number of responses, for example 200. An embodiment inputs the generated prompt to the LLM, thereby prompting, or causing, the LLM to select a set of candidate agents from the plurality of agents.

Another embodiment limits the number of agents the LLM considers for inclusion in the set of candidate agents, by labelling an agent in the agent catalog according to which predefined goals the agent belongs in and performing candidate agent selection on the subset of agents that belong to the user's goal. To label an agent according to which predefined goals the agent belongs in, an embodiment constructs a prompt that includes a particular agent and goal description and asks the LLM if the particular agent belongs in the goal. The prompt also constrains the LLM's response to yes/no answers only. An agent/goal combination for which the LLM answers "yes" is used when selecting candidate agents for that goal.

An embodiment scores each candidate agent using metadata of the set of candidate agents. In particular, an embodiment computes an input-output signature score, a path score (if applicable), and a semantic matching score for each candidate agent.

An embodiment computes an input-output signature score for each candidate agent, by computing a semantic similarity between the output data field(s) of a target agent and input data field(s) of each candidate agent, and using the computed semantic similarity as the input-output signature score. Computing the semantic similarity validates the data conformance of the target agent and each candidate agent that could follow the target agent in an execution sequence. One embodiment computes a semantic similarity between descriptions in agent metadata of the output data field(s) of a target agent and descriptions in agent metadata of the input data field(s) of each candidate agent. Another embodiment computes a semantic similarity between the actual or simulated output of a target agent and simulated input to each candidate agent. One embodiment prompts an LLM to compute the semantic similarity. Another embodiment uses a presently available technique to generate an embedding representing each of the items being compared, and computes a similarity (e.g., a cosine similarity) between the embeddings. An embedding is a multidimensional numerical representation of an item, generated by an embedding model in such a manner that more semantically similar items have embeddings that are closer together than embeddings representing items that are less semantically similar. Other semantic similarity computation techniques are also possible and contemplated within the scope of the illustrative embodiments.

If APIs in the API catalog are present in hierarchies, an embodiment computes a path score based on whether a candidate agent is a sibling, descendent, or ancestor of a target agent. One embodiment sets the path score to one if a candidate agent is a sibling, descendent, or ancestor of a target agent, and zero if a candidate agent is not a sibling, descendent, or ancestor of a target agent. The path score is useful in selecting among intra-application candidate agents. If a previous agent invoked before the target agent is known from an agent execution history, the embodiment adjusts a path score based on whether a candidate agent is a sibling, descendent, or ancestor of a previous agent. One embodiment sets the path score to one if a candidate agent is a sibling, descendent, or ancestor of a previous agent, and zero if a candidate agent is not a sibling, descendent, or ancestor of a previous agent.

An embodiment computes a semantic matching score for each candidate agent, by computing a semantic similarity between the description of a target agent in agent metadata and the description of each candidate agent in agent metadata, and using the computed semantic similarity as the semantic matching score. One embodiment prompts an LLM to compute the semantic similarity. Another embodiment uses a presently available technique to generate an embedding representing each of the items being compared, and computes a similarity (e.g., a cosine similarity) between the embeddings.

An embodiment prompts the LLM to select a next agent from the set of scored candidate agents, using a set of business policy constraints. Business policy constraints, or rules, adjust a weighting the LLM is to give a particular score or categorization of a candidate agent. Some non-limiting examples of business policy constraints expressed in natural language form prescribe a higher weight to intra-application APIs and APIs in the data manipulation category than other APIs, prescribe a higher weight to inter-application APIs and APIs in the action category, forbid an agent from performing a delete operation immediately after a target or previous agent performed a create operation, and prescribe a highest weighting to a candidate agent's signature score because input-output matching is a primary agent selection criterion. In particular, an embodiment generates a prompt that asks the LLM to select one or more next best agents, given the set of business policy constraints and the set of candidate agents with each agent's input-output signature score, path score (if applicable), and semantic matching score, and inputs the prompt to the LLM. One non-limiting example of such a prompt is:

Input:

Business policies: [Policy-1 {Category,Description}, Policy-2 {Category,Description},]

Shortlisted Agents: [agent-a {Agent category, App, Description, Scores [0.4,0.6,0.8]}, agent-b {Agent category, App, Description, Scores [0.5,0.6,0.9]}, agent-c {Agent category, App, Description, Scores [0.4,0.2,0.7] },]

Output:

NBAs: [agent-a {Agent category, App, Description, Scores [0.4,0.6,0.8]}, agent-c {Agent category, App, Description, Scores [0.4,0.2,0.7]}]

Optionally, the prompt includes a constraint limiting the LLM to a particular number of selected agents (e.g., one or five). Using the LLM allows an embodiment to utilize business policy constraints expressed in natural language form directly. Another embodiment, instead of utilizing business policy constraints expressed in natural language form directly, converts the business policy constraints to numerical weights corresponding to particular scores and computes a weighted average of each candidate agent's input-output signature score, path score (if applicable), and semantic matching score.

An embodiment presents one or more of the LLM's selected next best agents as next best agent recommendation(s) to a user, and solicits a user selection of an agent from the recommendations. An embodiment uses the user's selection as a next agent, and invokes the next agent, causing the next agent to perform an action furthering the goal. If the user rejects all the recommended agents, an embodiment solicits additional goal or task detail from the user via an additional utterance, and repeats the next agent recommendation process using the additional utterance.

Another embodiment omits the recommendation and user selection, and instead uses the LLM's output in response to the prompt as the next agent. The embodiment invokes the next agent, causing the next agent to perform an action furthering the goal.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as application 200 implementing next best agent selection in an adaptive workflow. In addition to application 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and application 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in application 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in application 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

With reference to FIG. 2, this figure depicts a block diagram of an example configuration for next best agent selection in an adaptive workflow in accordance with an illustrative embodiment. Application 200 is the same as application 200 in FIG. 1.

In the illustrated embodiment, application 200 receives goal policies, a set of goals supported by application 200. Some non-limiting examples of goal policies are: provide support for a product defect, account access, shipping issues, and the like. Target agent and goal extraction module 220 receives a user utterance. Two non-limiting examples of an utterance are: "when does my subscription expire" and "how much is shipping on Product A". Using a presently available intent identification model and one or more goal policies, module 220 extracts a goal from the utterance. The goal is a task the user wants to perform. One implementation of module 220 also identifies a target agent that could be used to accomplish at least a portion of the goal. For example, for the utterance "when does my subscription expire", a goal might be subscription_inquiry and a target agent might be the subscription_status agent. One implementation of module 220 also extracts metadata of the goal from the utterance and one or more goal policies.

Application 200 has access to metadata describing a plurality of agents. The agents are available for use by application 200 to further or accomplish the goal. In one implementation of application 200, the agents are stored in an agent catalog or repository. Agent categorization module 210 uses the metadata to classify an agent into one or more categories. One implementation of module 210 uses a presently available technique to classify agents into a data manipulation or an action category, based on an API's description and the operators supported (e.g., GET, POST, PUT, DELETE and CRUD Operators (create, read, write, delete)). Another implementation of module 210 classifies agents as either intra-application (belonging to the same application as a target agent) or inter-application (belonging to a different application from the target agent. This can be identified from the metadata information, for example using an application-id tag in agent metadata.

Candidate agent identification (ID) module 230 uses metadata describing the plurality of agents, for example the API descriptions, as well as the goal and metadata of the goal, to generate a prompt to a trained LLM. An LLM, implemented using an artificial neural network, is a presently available language model that, when trained, can perform general-purpose language generation and other natural language processing tasks such as classification. An input to an LLM is referred to as a prompt, because the input prompts the LLM to produce a corresponding output. One implementation of module 230 generates a prompt that includes the goal and descriptions of the agents (from metadata describing the plurality of agents). The prompt asks the LLM for the top-k (where k denotes an integer) next best agents that should be sequenced after a target agent, with which to implement an action furthering the goal. These top-k next best agents are candidate agents, and correspond to the goal. One implementation of module 230 also includes guidance language in the prompt to limit the output to a particular number of responses, for example 200. Module 230 inputs the generated prompt to the LLM, thereby prompting, or causing, the LLM to select a set of candidate agents from the plurality of agents.

Another implementation of module 230 limits the number of agents the LLM considers for inclusion in the set of candidate agents, by labelling an agent in the agent catalog according to which predefined goals the agent belongs in and performing candidate agent selection on the subset of agents that belong to the user's goal. To label an agent according to which predefined goals the agent belongs in, module 230 constructs a prompt that includes a particular agent and goal description and asks the LLM if the particular agent belongs in the goal. The prompt also constrains the LLM's response to yes/no answers only. An agent/goal combination for which the LLM answers "yes" is used when selecting candidate agents for that goal.

Candidate agent scoring module 240 scores each candidate agent using metadata of the set of candidate agents. In particular, module 240 computes an input-output signature score, a path score (if applicable), and a semantic matching score for each candidate agent.

Module 240 computes an input-output signature score for each candidate agent, by computing a semantic similarity between the output data field(s) of a target agent and input data field(s) of each candidate agent, and using the computed semantic similarity as the input-output signature score. Computing the semantic similarity validates the data conformance of the target agent and each candidate agent that could follow the target agent in an execution sequence. One implementation of module 240 computes a semantic similarity between descriptions in agent metadata of the output data field(s) of a target agent and descriptions in agent metadata of the input data field(s) of each candidate agent. Another implementation of module 240 computes a semantic similarity between the actual or simulated output of a target agent and simulated input to each candidate agent. One implementation of module 240 prompts an LLM to compute the semantic similarity. Another implementation of module 240 uses a presently available technique to generate an embedding representing each of the items being compared, and computes a similarity (e.g., a cosine similarity) between the embeddings. An embedding is a multidimensional numerical representation of an item, generated by an embedding model in such a manner that more semantically similar items have embeddings that are closer together than embeddings representing items that are less semantically similar. Other semantic similarity computation techniques are also possible.

If APIs in the API catalog are present in hierarchies, module 240 computes a path score based on whether a candidate agent is a sibling, descendent, or ancestor of a target agent. One implementation of module 240 sets the path score to one if a candidate agent is a sibling, descendent, or ancestor of a target agent, and zero if a candidate agent is not a sibling, descendent, or ancestor of a target agent. The path score is useful in selecting among intra-application candidate agents. If a previous agent invoked before the target agent is known from an agent execution history, module 240 adjusts a path score based on whether a candidate agent is a sibling, descendent, or ancestor of a previous agent. One implementation of module 240 sets the path score to one if a candidate agent is a sibling, descendent, or ancestor of a previous agent, and zero if a candidate agent is not a sibling, descendent, or ancestor of a previous agent.

Module 240 computes a semantic matching score for each candidate agent, by computing a semantic similarity between the description of a target agent in agent metadata and the description of each candidate agent in agent metadata, and using the computed semantic similarity as the semantic matching score. One implementation of module 240 prompts an LLM to compute the semantic similarity. Another implementation of module 240 uses a presently available technique to generate an embedding representing each of the items being compared, and computes a similarity (e.g., a cosine similarity) between the embeddings.

Module 240 computes a semantic matching score for each candidate agent, by computing a semantic similarity between the description of a target agent in agent metadata and the description of each candidate agent in agent metadata, and using the computed semantic similarity as the semantic matching score. One implementation of module 240 prompts an LLM to compute the semantic similarity. Another implementation of module 240 uses a presently available technique to generate an embedding representing each of the items being compared, and computes a similarity (e.g., a cosine similarity) between the embeddings.

Next agent module 250 prompts the LLM to select a next agent from the set of scored candidate agents, using a set of business policy constraints. Business policy constraints, or rules, adjust a weighting the LLM is to give a particular score or categorization of a candidate agent. Some non-limiting examples of business policy constraints expressed in natural language form prescribe a higher weight to intra-application APIs and APIs in the data manipulation category than other APIs, prescribe a higher weight to inter-application APIs and APIs in the action category, forbid an agent from performing a delete operation immediately after a target or previous agent performed a create operation, and prescribe a highest weighting to a candidate agent's signature score because input-output matching is a primary agent selection criterion. In particular, module 250 generates a prompt that asks the LLM to select one or more next best agents, given the set of business policy constraints and the set of candidate agents with each agent's input-output signature score, path score (if applicable), and semantic matching score, and inputs the prompt to the LLM. One non-limiting example of such a prompt is:

Input:

Business policies: [Policy-1 {Category,Description}, Policy-2 {Category,Description},]

Shortlisted Agents: [agent-a {Agent category, App, Description, Scores [0.4,0.6,0.8]}, agent-b {Agent category, App, Description, Scores [0.5, 0.6,0.9]}, agent-c {Agent category, App, Description, Scores [0.4, 0.2,0.7]},]

Output:

NBAs: [agent-a {Agent category, App, Description, Scores [0.4,0.6,0.8]}, agent-c {Agent category, App, Description, Scores [0.4, 0.2,0.7]}]

Optionally, the prompt includes a constraint limiting the LLM to a particular number of selected agents (e.g., one or five). Using the LLM allows module 250 to utilize business policy constraints expressed in natural language form directly. Another implementation of module 250, instead of utilizing business policy constraints expressed in natural language form directly, converts the business policy constraints to numerical weights corresponding to particular scores and computes a weighted average of each candidate agent's input-output signature score, path score (if applicable), and semantic matching score.

Module 250 presents one or more of the LLM's selected next best agents as next best agent recommendation(s) to a user, and solicits a user selection of an agent from the recommendations. Module 250 uses the user's selection as a next agent, and invokes the next agent, causing the next agent to perform an action furthering the goal. If the user rejects all the recommended agents, module 250 solicits additional goal or task detail from the user via an additional utterance, and repeats the next agent recommendation process using the additional utterance.

Another implementation of module 250 omits the recommendation and user selection, and instead uses the LLM's output in response to the prompt as the next agent. The implementation invokes the next agent, causing the next agent to perform an action furthering the goal.

With reference to FIG. 3, this figure depicts an example of next best agent selection in an adaptive workflow in accordance with an illustrative embodiment. Agent categorization module 210 is the same as agent categorization module 210 in FIG. 2. The example can be executed using application 200 in FIG. 2.

Agent API catalog 310 includes a plurality of agents, as well as metadata describing the plurality of agents. The agents are available for use by application 200 to further or accomplish the goal. Agent categorization module 210 uses the metadata of the agents in agent API catalog 310 to classify an agent into one or more categories (such as the categories in API categories 320), resulting in API categorizations 330. The categories in API categories 320 include a data manipulation or an action category, based on an API's description and the operators supported (e.g., GET, POST, PUT, DELETE and CRUD Operators (create, read, write, delete)). The categories in API categories 320 also include intra-application (belonging to the same application as a target agent) and inter-application (belonging to a different application from the target agent.

With reference to FIG. 4, this figure depicts a continued example of next best agent selection in an adaptive workflow in accordance with an illustrative embodiment. Target agent and goal extraction module 220, candidate agent ID module 230, and candidate agent scoring module 240 are the same as target agent and goal extraction module 220, candidate agent ID module 230, and candidate agent scoring module 240 in FIG. 2. Agent API catalog 310 and API categorizations 330 are the same as agent API catalog 310 and API categorizations 330 in FIG. 3.

Target agent and goal extraction module 220 receives user utterance 400 and goal policies 402. Using a presently available intent identification model and goal policies 402, module 220 extracts target autonomous agent 410 and goal 412 from user utterance 400.

Candidate agent ID module 230 uses metadata describing the plurality of agents (from agent API catalog 310 and API categorizations 330, for example the API descriptions, as well as target autonomous agent 410 and goal 412, to generate a prompt to a trained LLM, thereby prompting, or causing, the LLM to select candidate agents 430.

Candidate agent scoring module 240 scores each candidate agent in candidate agents 430. In particular, module 240, in signature-based matching 420, computes an input-output signature score for each candidate agent. Module 240, in path based matching 422, computes a path score (if applicable) for each candidate agent. Module 240, in semantic matching 424, computes a semantic matching score for each candidate agent. The results are represented as scored candidate agents 440.

Figure 5:
FIG. 5 depicts a continued example of next best agent selection in an adaptive workflow in accordance with an illustrative embodiment.

With reference to FIG. 5, this figure depicts a continued example of next best agent selection in an adaptive workflow in accordance with an illustrative embodiment. Next agent module 250 is the same as next agent module 250 in FIG. 2. scored candidate agents 440 is the same as scored candidate agents 440 in FIG. 4.

Next agent module 250 prompts the LLM to select a next agent from scored candidate agents 440, using business policy constraints 500, and presents one or more of the LLM's selected next best agents as next best agent recommendation 510 to a user. Another implementation of module 250 omits the recommendation and user selection, and instead generates next best agent invocation 520, causing the next agent to perform an action furthering the goal.

Figure 6:
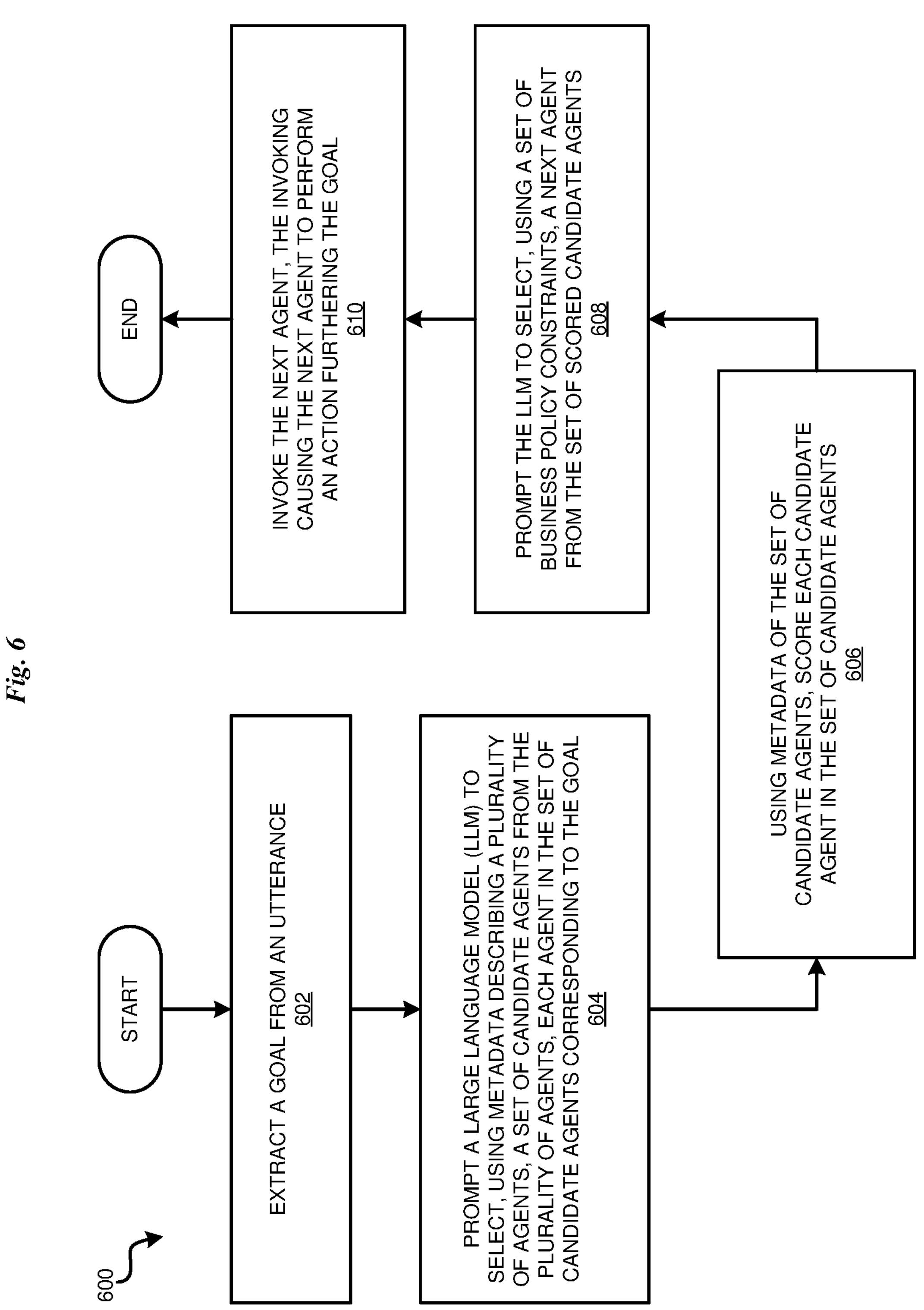
FIG. 6 depicts a flowchart of an example process for next best agent selection in an adaptive workflow in accordance with an illustrative embodiment.

With reference to FIG. 6, this figure depicts a flowchart of an example process for next best agent selection in an adaptive workflow in accordance with an illustrative embodiment. Process 600 can be implemented in application 200 in FIG. 2.

In the illustrated embodiment, at block 602, the process extracts a goal from an utterance. At block 604, the process prompts a large language model (LLM) to select, using metadata describing a plurality of agents, a set of candidate agents from the plurality of agents, each agent in the set of candidate agents corresponding to the goal. At block 606, the process, using metadata of the set of candidate agents, scores each candidate agent in the set of candidate agents. At block 608, the process prompts the LLM to select, using a set of business policy constraints, a next agent from the set of scored candidate agents. At block 610, the process invokes the next agent, the invoking causing the next agent to perform an action furthering the goal. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

extracting, from an utterance, a goal;

generating a prompt based on the goal, metadata describing a plurality of agents, and guidance language that limits output to a particular number of responses;

prompting, using the generated prompt, a large language model (LLM) to select a set of candidate agents from the plurality of agents, each candidate agent in the set of candidate agents corresponding to the goal;

scoring, using metadata of the set of candidate agents, each candidate agent in the set of candidate agents, the scoring resulting in a set of scored candidate agents, prompting the LLM to select, using a set of business policy constraints, a next agent from the set of scored candidate agents, the prompting causing deploying the next agent from an agent repository;

invoking the next agent, the invoking causing performing, by the next agent, an action via an application programming interface (API), the action furthering the goal, the action comprising a data manipulation operation, the data manipulation operation comprising one of a create operation, a read operation, a write operation, and a delete operation; and forbidding the next agent from performing the delete operation if the delete operation is immediately after a previous agent performed the create operation.

2. The computer-implemented method of claim 1, wherein prompting the LLM to select the set of candidate agents comprises:

generating a first prompt comprising the goal, the metadata describing the plurality of agents, and an instruction to select a candidate agent furthering the goal; and causing, using the first prompt, the LLM to generate an output comprising the candidate agent.

3. The computer-implemented method of claim 1, wherein scoring a candidate agent comprises:

computing an input-output signature score, the input-output signature score comprising a first semantic similarity between metadata describing an output data field of a target agent and metadata describing an input data field of a candidate agent, the target agent extracted from the utterance.

4. The computer-implemented method of claim 3, wherein the first semantic similarity is determined using the LLM.

5. The computer-implemented method of claim 1, wherein scoring a candidate agent comprises:

computing a path score based on a location of the candidate and a target agent in an agent hierarchy, the target agent extracted from the utterance.

6. The computer-implemented method of claim 1, wherein scoring a candidate agent comprises:

computing a semantic matching score, the semantic matching score comprising a second semantic similarity between metadata describing a target agent and metadata describing a candidate agent, the target agent extracted from the utterance.

7. The computer-implemented method of claim 6, wherein the second semantic similarity is determined using the LLM.

8. The computer-implemented method of claim 1, wherein prompting the LLM to select the next agent from the set of scored candidate agents comprises:

generating a second prompt comprising the set of business policy constraints, the set of scored candidate agents, and an instruction to select a best next agent from the set of scored candidate agents; and causing, using the second prompt, the LLM to generate an output comprising the next agent.

9. A computer program product comprising one or more computer readable storage media, and program instructions collectively stored on the one or more computer readable storage media, the program instructions executable by a processor to cause the processor to perform operations comprising:

extracting, from an utterance, a goal;

generating a prompt based on the goal, metadata describing a plurality of agents, and guidance language that limits output to a particular number of responses;

prompting, using the generated prompt, a large language model (LLM) to select a set of candidate agents from the plurality of agents, each candidate agent in the set of candidate agents corresponding to the goal;

scoring, using metadata of the set of candidate agents, each candidate agent in the set of candidate agents, the scoring resulting in a set of scored candidate agents, prompting the LLM to select, using a set of business policy constraints, a next agent from the set of scored candidate agents, the prompting causing deploying the next agent from an agent repository;

invoking the next agent, the invoking causing performing, by the next agent, an action via an application programming interface (API), the action furthering the goal, the action comprising a data manipulation operation, the data manipulation operation comprising one of a create operation, a read operation, a write operation, and a delete operation; and forbidding the next agent from performing the delete operation if the delete operation is immediately after a previous agent performed the create operation.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

12. The computer program product of claim 9, wherein prompting the LLM to select the set of candidate agents comprises:

generating a first prompt comprising the goal, the metadata describing the plurality of agents, and an instruction to select a candidate agent furthering the goal; and causing, using the first prompt, the LLM to generate an output comprising the candidate agent.

13. The computer program product of claim 9, wherein scoring a candidate agent comprises:

computing an input-output signature score, the input-output signature score comprising a first semantic similarity between metadata describing an output data field of a target agent and metadata describing an input data field of a candidate agent, the target agent extracted from the utterance.

14. The computer program product of claim 13, wherein the first semantic similarity is determined using the LLM.

15. The computer program product of claim 9, wherein scoring a candidate agent comprises:

computing a path score based on a location of the candidate and a target agent in an agent hierarchy, the target agent extracted from the utterance.

16. The computer program product of claim 9, wherein scoring a candidate agent comprises:

computing a semantic matching score, the semantic matching score comprising a second semantic similarity between metadata describing a target agent and metadata describing a candidate agent, the target agent extracted from the utterance.

17. The computer program product of claim 16, wherein the second semantic similarity is determined using the LLM.

18. The computer program product of claim 9, wherein prompting the LLM to select the next agent from the set of scored candidate agents comprises:

generating a second prompt comprising the set of business policy constraints, the set of scored candidate agents, and an instruction to select a best next agent from the set of scored candidate agents; and causing, using the second prompt, the LLM to generate an output comprising the next agent.

19. A computer system comprising a processor and one or more computer readable storage media, and program instructions collectively stored on the one or more computer readable storage media, the program instructions executable by the processor to cause the processor to perform operations comprising:

extracting, from an utterance, a goal;

generating a prompt based on the goal, metadata describing a plurality of agents, and guidance language that limits output to a particular number of responses;

prompting, using the generated prompt, a large language model (LLM) to select a set of candidate agents from the plurality of agents, each candidate agent in the set of candidate agents corresponding to the goal;

scoring, using metadata of the set of candidate agents, each candidate agent in the set of candidate agents, the scoring resulting in a set of scored candidate agents, prompting the LLM to select, using a set of business policy constraints, a next agent from the set of scored candidate agents, the prompting causing deploying the next agent from an agent repository;

invoking the next agent, the invoking causing performing, by the next agent, an action via an application programming interface (API), the action furthering the goal, the action comprising a data manipulation operation, the data manipulation operation comprising one of a create operation, a read operation, a write operation, and a delete operation; and forbidding the next agent from performing the delete operation if the delete operation is immediately after a previous agent performed the create operation.

20. The computer system of claim 19, wherein prompting the LLM to select the set of candidate agents comprises:

generating a first prompt comprising the goal, the metadata describing the plurality of agents, and an instruction to select a candidate agent furthering the goal; and causing, using the first prompt, the LLM to generate an output comprising the candidate agent.

* * * * *